(12) United States Patent
Burnett et al.

(10) Patent No.: US 6,405,909 B1
(45) Date of Patent: Jun. 18, 2002

(54) SEAT-MOUNTED GUN AND ROD HOLDER

(76) Inventors: Thomas L. Burnett; Jerold A. Evans, both of 520 W. Griffin Dr., Bozeman, MT (US) 59715

( * ) Notice: Subject to any disclaimer, the term of this patent is extended or adjusted under 35 U.S.C. 154(b) by 1 day.

(21) Appl. No.: 09/691,480

(22) Filed: Oct. 17, 2000

Related U.S. Application Data (60) Provisional application No. 60/166,086, filed on Nov. 17, 1999.

(51) Int. Cl.[7] .................................................. B60R 7/00
(52) U.S. Cl. ........................ 224/275; 224/572; 224/913; 224/922; 211/64; D6/552
(58) Field of Search ............................... 224/275, 572, 224/913, 922; 211/64; D6/552

(56) References Cited

U.S. PATENT DOCUMENTS

| 959,072 A | 5/1910 | Reithmiller |
| 2,535,564 A | 12/1950 | Campbell |
| 2,577,713 A | 12/1951 | Nogle |
| 2,797,033 A | 6/1957 | Rasbach |
| 2,853,219 A | 9/1958 | Schwartz |
| 3,014,759 A | 12/1961 | Bing |
| 3,167,182 A | 1/1965 | Calvin |
| 3,526,238 A | 9/1970 | Brayton |
| 4,995,537 A * | 2/1991 | Thedieck ...................... 211/64 |
| 5,027,960 A * | 7/1991 | Rainville ..................... 211/118 |
| 5,226,576 A * | 7/1993 | Ellsworth .................... 224/275 |
| 5,443,191 A | 8/1995 | Jorgenson |
| 5,490,623 A | 2/1996 | McConnell |
| 5,495,969 A | 3/1996 | Cardenas |
| 5,544,797 A * | 8/1996 | Silva .......................... 211/70.8 |
| 6,279,799 B1 * | 8/2001 | Horton ......................... 211/64 |

* cited by examiner

Primary Examiner—Stephen K. Cronin
(74) Attorney, Agent, or Firm—Robert M. Hunter (57) ABSTRACT

A vehicle seat-mounted gun and rod holder. Preferred embodiments include a strap embodiment that is attached by way of a strap to the crown or headrest of a vehicle seat, a cap embodiment that is attached by way of a cap to the crown of a vehicle seat, a band model that is attached by way of a band to a bench vehicle seat and a casement model that is attached by any of the mentioned ways.

12 Claims, 8 Drawing Sheets

SEAT-MOUNTED GUN AND ROD HOLDER

CROSS-REFERENCE TO RELATED APPLICATIONS

This application claims the benefit of U.S. Provisional Application No. 60/166,086, filed Nov. 17, 1999, the disclosure of which application is incorporated by reference as if filly set forth herein.

STATEMENT REGARDING FEDERALLY SPONSORED RESEARCH OR DEVELOPMENT

Not Applicable

BACKGROUND OF THE INVENTION

This invention relates to automobile accessories. In particular, the invention relates to an automotive accessory for stowing and transporting guns, rods and other long implements, secured to the backrests or headrests of vehicle seats.

Gun and fishing rod users often travel together and typically have several guns and/or fishing rods and few places to store them in a vehicle cab. The guns or rods are typically stored on the seats or on the floor. When stored in this manner, the guns are scratched and sights and telescopes are dislodged and/or fishing lines are tangled. Moreover, the resulting disorder is unsafe.

For decades, gun owners have carried guns in metal or plastic gun racks attached to the back wall of their pickup trucks where they were visible through the window. The guns are visible, inviting break-in and theft. Another significant limitation of this approach is that headroom is compromised. Such gun racks either have an insecure mounting system or require the drilling of holes in the metal body of the vehicle.

Another approach to vehicle gun storage involves a roof-mounted gun rack which is attached to the vehicle by means of screws installed through the cloth covered headliner which covers the interior of the vehicle ceiling. While this device is not seat-mounted, its consideration illustrates difficulties that users must face in trying to solve the gun stowage problem. Screwing through the headliner is a major limitation of this approach. Users are loathe to drill holes in the roof of their expensive vehicles, fearing that they may drill too far and perforate the outside metal. Users also dislike marring the headliner of their vehicles. Moreover, when the gun rack is removed, the holes remain, decreasing the vehicle's trade-in value. The foam material used to line the gun rack hoops does not adhere well, and frequently falls off. In addition, users often strike their heads against the gun rack, which can cause injury. The fact that many people have purchased this type of device, with all of its failings, attests to the magnitude and persistence of the vehicle gun stowage problem.

Guns are also stored in vehicles by suspending them from vehicle seats. One way for hunters to carry long firearms suspended from seats is in an internal pouch sewn into the back portion of a vehicle seat cover. This approach has certain disadvantages: only one gun can be carried and only solid-back bench seats can accommodate the pouch, precluding the use of this technique in vehicles with 40 percent driver-60 percent passenger split seats or bucket seats. In addition, with this approach, the pouch is accessible only from one side of the vehicle, e.g., from the driver's side.

Another design for a seat-mounted gun holder involves sewing external pouches onto the vehicle seat backs. This approach has the limitation that only solid-back bench vehicle seat covers can have this external pouch incorporated into them. Another limitation is that a new seat cover has to be purchased that provides the gun-carrying function. Yet another limitation is that the peep sight at the end of the gun barrel is prone to snag the interior material of the pouch as the gun is placed into, and retrieved from, the pouch. A further limitation is that the center of gravity of the gun is not in the user's hand: the user places the barrel of the gun into the pouch and then pushes the gun through from the butt end. In this way, the tip of the barrel can snag on the material on the inside of the pouch. The pouches swing freely, resulting in guns slapping on the back of the vehicle cab, possibly damaging them.

Another seat-mounted gun rack is a metal device, coated with plastic to protect the guns and to prevent them from shifting. A hook at the top of the device (having the appearance of a shepherd's crook) is used to attach the gun rack to the top of the vehicle seat. Formed metal hooks are incorporated into the rack in vertical sequence, parallel to the seat back. This design has a number of limitations. The top hook is hard and is uncomfortable when a passenger leans against it. Because the device compromises the cushioning effect of the seat back, it is unsafe in the case of a rear-end collision. As the top hook is only one-inch wide and the entire weight of the guns (which can total up to 24 pounds) is held by the hook, the foam core of the seat can be damaged by compression. Furthermore, this device is primarily useful on bench seats, not on bucket seats or 40 percent driver-60 percent passenger split seats. Also, the single strap which attaches the rack to the vehicle under the seat upon which it is installed allows for axial instability of the rack. Moreover, the hook provided on the end of that single strap is not sufficiently universal and not all seats have parts to which the hook can be attached. Finally, the adjustable buckle which tightens the strap is inconvenient to manipulate.

The background art is characterized by U.S. Pat. Nos. 959,072; 2,535,564; 2,577,713; 2,797,033; 2,853,219; 3,014,759; 3,167,182; 3,526,238; 5,443,191; 5,490,623 and 5,495,969; the disclosures of which patents are incorporated by reference as if fully set forth herein.

Reithmiller in U.S. Pat. No. 959,072 discloses a vehicle seat back umbrella holder. This invention is limited in that it must be permanently fixed to the vehicle seat back using means that damage the upholstery.

Campbell in U.S. Pat. No. 2,535,564 discloses an automobile supporting rack for firearms and the like. This invention is limited in that the rigid hook portions that fit over the top of the seat interfere with the use of the seat and in that rigid hook members are used to support each gun.

Nogle in U.S. Pat. No. 2,577,713 discloses a portable gun rack. This invention is limited in that the pockets into which the guns are inserted are disposed at oblique angles with respect to the edges of the rack and in that the pockets are designed to prevent the wider end of the gun (e.g., the butt) from passing through the pocket, thus requiring that each gun be balanced in a pocket.

Rasback in U.S. Pat. No. 2,797,033 discloses a portable knock-down gun rack. The invention is limited in that the rigid grip portions that fit over the top of the seat interfere with the use of the seat and in that rigid loops are used to support each gun.

Schwartz in U.S. Pat. No. 2,853,219 discloses an umbrella container for automobiles. The invention is limited in that the rigid hooks that fit over the top of the seat interfere with the use of the seat.

Bing in U.S. Pat. No. 3,014,759 discloses an automobile utility bag. This invention is limited in that compartments are located adjacent to other compartments horizontally and are separated by a rigid divider and require straps for straps for supporting the tops of the compartments instead of being stacked vertically to provide easier access, in that no top or bottom rods are provided to facilitate support of the bag on the seat back, in that no end spacers are provided to provide definition to the compartments, and in that an excessive amount of material comprising a panel having tucks and straps is used to secure the bag to the seat back. Moreover, in that compartments are not stacked vertically, less knee room is available for passengers in the seat behind that upon which the bag is secured.

Calvin in U.S. Pat. No. 3,167,182 discloses a gun rack. This invention is limited in that either it must be permanently fixed to the vehicle seat back using means that damage the upholstery or in that the rigid hooked upper ends that fit over the top of the seat interfere with the use of the seat. Moreover, it is limited in that rigid hook members are used to support each gun.

Brayton in U.S. Pat. No. 3,526,238 discloses a safety zipboot and umbrella. This invention is limited in that it must be permanently fixed to the vehicle seat back using means that damage the upholstery.

Jorgenson in U.S. Pat. No. 5,443,191 discloses a portable vehicle-mounted gun rack. The invention is limited in that the rack itself as well as the rigid hooks that fit over the top of the seat interfere with the use of the seat.

McConnell in U.S. Pat. No. 5,490,623 discloses a utility bag. This invention is limited in that is not capable of accommodating rifles or fishing rods.

Cardenas in U.S. Pat. No. 5,495,969 discloses a recreational vehicle portable gun rack system. The invention is limited in that guns stored in the rack as well as the rigid lips that fit over the top of the seat interfere with the use of the seat.

There would thus be substantial benefit in a gun and rod holder or utility bag which is seat-mounted, has stacked compartments, allows access from either side of a vehicle, does not damage interior surfaces of a vehicle, allows for orderly carrying of one or more guns and/or fishing rods, and does not require permanent attachment to the seat or any other part of the vehicle.

BRIEF SUMMARY OF THE INVENTION

The invention is a seat-mounted gun and rod holder or utility bag that mounts on vehicle seats. A preferred embodiment of the invention comprises two slings attached to the upper portions of vehicle seats by straps, caps or bands and is restrained at the bottom at points of fastening to the vehicle seats. Each sling has at least one (and, preferably, two or more) compartments which are open on both sides or ends. When installed on seats, slings are separated, preferably by a gap of about 20 to 35 inches. The gap allows a user to grip each gun in the middle, near its center of gravity where it is easiest to handle, and to insert the barrel end through the far compartment and beyond, then draw it back to house the butt end of the gun in the near compartment.

The weight of the gun and rod holder is borne either by straps, caps or bands, depending on the seat design. With the cap embodiment, the caps cover a portion of the tops of the seats, preferably the top 7 to 8 inches of the seat. A sling is attached to the lower edge of each of the caps. In the case of strap embodiment, the straps encircle and buckle around the tapered shoulders of the seat. On seats with adjustable headrests, the straps encircle and buckle around the metal headrest support posts. The points of fastening at the bottom edge of the slings are restrained by shock cords which are hooked into them, with the other end of the shock cords being hooked to springs or wires underneath the vehicle seat. This feature confines the slings so that they do not swing or bounce when the vehicle moves.

In one sense, the invention is a utility bag or gun or rod holder or rack for attachment to vehicle seats. In another sense, the invention is an automotive accessory or vehicle-seat-borne storage device, gun rack or rod holder comprising a compartment or series of vertically-stacked compartments that house guns, rods or other long implements in a generally horizontal position, and means of suspending said compartments from seats by straps or encasement of the upper portion of said seats. Because the gun or rod holder is suspended behind the seats, guns and rods are kept off the floor and off seating surfaces. In this way, the advantage of organization is realized. Another advantage is that knee room for passengers in the back seat, and headroom for all occupants is not diminished. A further advantage is that the guns and/or rods are securely held in compartments, the lining of which is not abrasive. Thus, damage to guns' surfaces, sights and telescopes is reduced. Yet another advantage is that a natural shock absorber effect is created by the fact that the gun rack is suspended from seats which are partially made of foam. In this way, the guns are spared the jolting and jarring they would be subject to if unrestrained or if stored in a rigid rack. Another advantage is that guns are not prominently displayed to passers-by, because they are located in the slings' compartments at or below the window line of the vehicle. A further advantage is that multiple guns can be carried in a vehicle. Yet another advantage is that various configurations of vehicle seats may be fitted with the device. Another advantage is that guns can be retrieved from either side of the vehicle. Another advantage is found in the fact that no permanent holes need to be drilled into the vehicle to accomplish the mounting of the rack. Yet another advantage is that the gun rack can be rapidly installed on vehicle seats (e.g., in seconds) and removed as quickly. This is advantageous to users who want to have the rack in place only for expeditions and to remove it for everyday use of the vehicle. The ease of installation and removal gives them this option. Another advantage is that, in preferred embodiments, the appearance of the gun rack is harmonious with that of the seat, the device being fabricated of sewn fabrics and conforming to the seats' natural contours.

The strap embodiment of the invention has the virtue of universality. It can be sold through mass retailers, such as Wal-Mart, Cabela's, Bass Pro Shops and K-Mart, with a minimum of part numbers, thus keeping inventories at a minimum. A printed package can be used to sell the product without a trained salesperson needed to guide the customer through the buying decision. The strap embodiment fits the seats of most vehicles in which gun owners usually carry guns. It fits seats with tapered shoulders and seats with adjustable headrests. Moreover, the strap embodiment can be moved from vehicle to vehicle.

A second embodiment of the invention is the cap embodiment. This embodiment has the marketing virtue of style in that the shape of the cap can be customized so that the apparatus appears to be integrated into the seat. It has the structural advantage of bearing the weight of the slings on the crown of the seat, rather than on the sides of the crown, and of distributing the weight over a broader area than the straps of the strap embodiment. In the case of some vehicle seats, use of the cap embodiment is almost imperative, in that the straps of the strap embodiment would slide down the nearly vertical sides of the crown of the seat.

A third embodiment of the invention is the band embodiment. This embodiment is applicable to seats with a horizontal top and no headrests. A band is attached to the top edge of each sling. From that point, the band extends upward to the ridge line of the seat backrest, then cascades down the front of the seat, lying between the seat upholstery and the user's body. The band continues into the bight of the seat and extends through to the back. There, points of fastening are employed to secure the band either to the under side of the seat, or to the top edge of the slings, near the position at which the sling is attached to the band. In a preferred embodiment, the band is coated with closed cell foam in order to give it a relatively high coefficient of friction where it contacts the vehicle seat upholstery, thus retarding slippage.

In other embodiments, other means of attaching the slings to the seat and accomplishing the weight-bearing function are used. In one embodiment, a girdle is used to encircle the seat, around the horizontal girth of the seat. The sling has material attached along its entire vertical side, encircling the seat and attaching to the other side of the sling. The attachment means are plastic or metal buckles, eyelet and hook, or hook-and-loop (Velcro®). Alternatively, the girdle is a tubular cylinder of stretch material that is simply pulled over the body of the seat backrest and attached along the full vertical side of each side of the sling. Extra vertical weight-bearing capacity is gained by augmenting the upper portion of the girdle with a strap and buckle, or a hook-and-loop (Velcro®) band, which is adjustable.

In alternative embodiments, vehicles with seats having adjustable headrests supported by two metal posts have slings borne up by a variety of methods. In one embodiment, flexible, sewn material with holes punched in it and trimmed with grommets allow insertion of the headrest posts through the holes. The slings are attached to this flexible, grommeted piece of material. Alternatively, the means of attachment is comprised of a rigid structure fabricated of a material such as plastic or metal having holes punched, drilled or formed in it for insertion of the headrest posts. The slings are attached to this rigid structure by means of riveting, sewing, or gluing.

In another alternative embodiment, the compartments in the slings are formed with metal, plastic, or wooden hoops instead of fabric hoops. In yet another alternative embodiment, adjustable straps are added to the face plates to cinch up each compartment providing less room for the stock of the gun, thereby reducing movement of the gun in the sling. Another embodiment of the invention is provided with only one compartment per sling, with the compartment accommodating only one gun, rather than providing compartments for two, three, or four guns as in the preferred embodiments. Users in states where the law requires that guns be transported in an enclosed case may desire gun racks with only one or two compartments per sling, to provide room for the gun case(s).

Another embodiment of the invention is the casement embodiment. With this embodiment, instead of providing two slings to support the guns, the guns are held in a one-piece case that is completely enclosed and secured by a Velcro® fastener or a zipper. The case is borne up and attached to the seat backrest by means of caps, straps and buckles, or bands. The case accommodates one or more guns in the horizontal position.

A wide variety of materials may be used for face plates and back plates. Alternatives include leather, vinyl-coated fiberglass, vinyl, see-through plastic, cotton and poly-cotton blends. In an alternative embodiment, an entirely molded rubber sling/compartment is provided. In this embodiment, the slings are made of jointed rubber, having an appearance similar to that of an old-fashioned roll-top desk. The lining of the compartments with no-slip material is not necessary. In alternative embodiments, the slings and compartments are wider or narrower that those shown for preferred embodiments. In some embodiments, pockets are attached on the slings, allowing users to store paperwork, ammunition, tools, and other items.

In some embodiments, no shock-cord fasteners are provided at the bottom corners of the slings. Alternatively, the function of keeping the guns from slapping against the seat back is accomplished with some other non-elastic item such as hook-and-loop (Velcro®), a metal or plastic spar which attaches on one end to the lower portion of the seat and on the other end to the point of fastening. A shock cord which has an adjustable end, allowing for variable length of the cord may be preferable over other shock cord and hook systems. Alternative fastening points are feasible, e.g., hook-and-loop (Velcro®), metal D-rings, and plastic or metal buckles. In some embodiments ropes are employed for fastening the bottom edge of the slings to the vehicle, instead of shock cords.

A preferred embodiment calls for stowage of guns in the vertical position. In this embodiment, one or more (e.g., two or three) guns are positioned behind a bucket seat. Each gun is held in place by a container at the base and quick-release straps or clasps located higher on the gun. This embodiment of the invention comprises some rigid, formed, welded, extruded, or molded components, e.g., a holder for the butt ends of the guns. The holder is connected by conventional means to the upper portion of the rack. The barrel(s) of the gun(s) are confined in the upper portion of the rack, but the confinement system allows easy manipulation for quick release of the gun(s). In this embodiment, the entire rack is attached to the seat back.

In a preferred embodiment, an optional or integral veil is incorporated into the device. In use, the veil is draped over the guns, lessening the chances for theft. The veil is configured to be easily thrown off or detached, giving access to the guns.

In a preferred embodiment, conventional fabrication processes are used to manufacture the device. Nylon face plate fabric is sent to a laminator who bonds ⅛-inch thick closed cell foam or neoprene to the back (non-showing) side of the face plate. These laminated goods are forwarded to a convertor who "slits" the entire roll with a "bologna cutter" or another cutting machine into the desired widths for the slings. The slit rolls of goods then go to a convertor who "sheets" or chops them into approximately 7-inch by 24-inch rectangles. The non-laminated nylon fabric for the back plate is also sent to the slitting and sheeting convertors. Slit and sheeted goods are trimmed with 1-inch nylon binding tape to impart a finished look. This step is accomplished using a tape folder screwed to the sewing machine table. A plurality of approximately 8-inch lengths of face plate are sewn to a plurality of approximately 6½-inch lengths of back plate to create compartments that can accommodate the butt end of a gun or fishing rod with a reel.

One-inch nylon bottom straps are sewn to the corners of the bottom edge of the sling. Each bottom strap is threaded through a fastening point and is sewn to a bottom corner of the back plate. A buckle component is sewn to one of two top straps and a second buckle component is threaded on a second top strap. The top straps are sewn to the top corners of the back plate. For a cap embodiment, a cap is sewn to the top edges of the back plate instead of sewing top straps to the corners of the top edge.

In a preferred embodiment, nylon straps and nylon buckles are used, 1000 denier nylon fabric is used for the face plate and the back plate, and neoprene foam or some close functional equivalent is used to line the interior of the face plates. Less expensive conventional materials can be substituted if customers express a desire for a less expensive product, without serious loss of durability and function.

To install the strap model, the user wraps a strap around the tapered shoulder region of the vehicle seat, or around the headrest posts, fastens the buckle components together and applies tension to the free end of the strap, tightening the strap. The user then attaches a hook on one end of each shock cord to a spring or wire under the seat. The hook on the other end of each shock cord is then attached to a fastening point at the bottom of the sling.

To install the cap embodiment, the user places the cap over the crown of the seat. The user then attaches a hook under the seat to a fixed point such as a wire or spring. The user then attaches the other hook to a fastening point at the bottom of the sling.

Users stow each gun in the device by routing the barrel end of the gun through and beyond a compartment in the far sling. The butt end of the gun is then drawn back into a compartment in the near sling. Fishing rods are stowed in the device in a similar way.

The invention is compatible with the seat of the vehicle in that it conforms to the shape, angle and appearance of the seat. It solves the problem of the hard metal hook contacting the body of the user. The cloth body of the device is easier on the gun. Two points of fastening on each sling give it greater axial (up and down) stability. The invention stores the guns and/or rods in a location that is less likely to be viewed by someone outside of the vehicle than a window racks is. Moreover, the invention accommodates more guns or rods than internal or external pouch designs. Thus, the invention is superior as regards the number of guns or rods stored, protection afforded the guns or rods, and ease of installation and use.

It is an object of the invention to provide a gun and fishing rod holder or utility bag which is easy to install on and remove from vehicle seats, and in which placing and retrieving guns or rods is simple. It is another object of the invention to provide vertical storage for one or more guns and/or rods. It is another object of the invention to keep guns and/or rods out of easy view of people outside of the vehicle. It is another object of the invention to provide mounting systems appropriate for a variety of vehicle seats. It is another object of the invention to give users access to guns and/or rods from either side of the vehicle. It is another object of the invention to provide a gun and rod stowage system which does not necessitate permanent damage to seats and other vehicle surfaces. It is another object of the invention to restrict the gun from jostling out of the gun rack. It is another object of the invention to protect gun sights and telescopes and surfaces such as wood, plastic or metal. It is another object of the invention to save knee room and generally to conserve room in vehicle interiors by the orderly placement of guns and rods.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

The following reference numerals are used to indicate the parts and environment of the invention the drawings:

1 sling
2 compartment
3 short weight-bearing strap
4 long weight-bearing strap
5 male buckle portion
6 female buckle portion
7 fastening point
8 elastic member
9 face plate
10 back plate
11 first area
12 second area
13 third area
14 fourth area
16 band
17 grommet
18 solid bench seat 19 non-showing side
20 closed-cell foam layer
21 strap
22 tapered shoulder regions
23 crown
24 adjustable headrests
25 seat backs
25 tapered shoulder seat area
26 line or point
27 headrest posts
29 length
30 shock cord
31 seats
40 strap embodiment
43 cap embodiment
47 band embodiment
49 seat cushion
50 seat backrest
51 ridge line
60 casement embodiment
61 prismatic compartment
63 front portion
65 bottom portion
67 end plate
69 closure
71 internal pocket
73 stiffener
75 plastic spacer
79 end pocket
81 top rod
83 bottom rod

DETAILED DESCRIPTION OF THE INVENTION

Figures 1, 2:
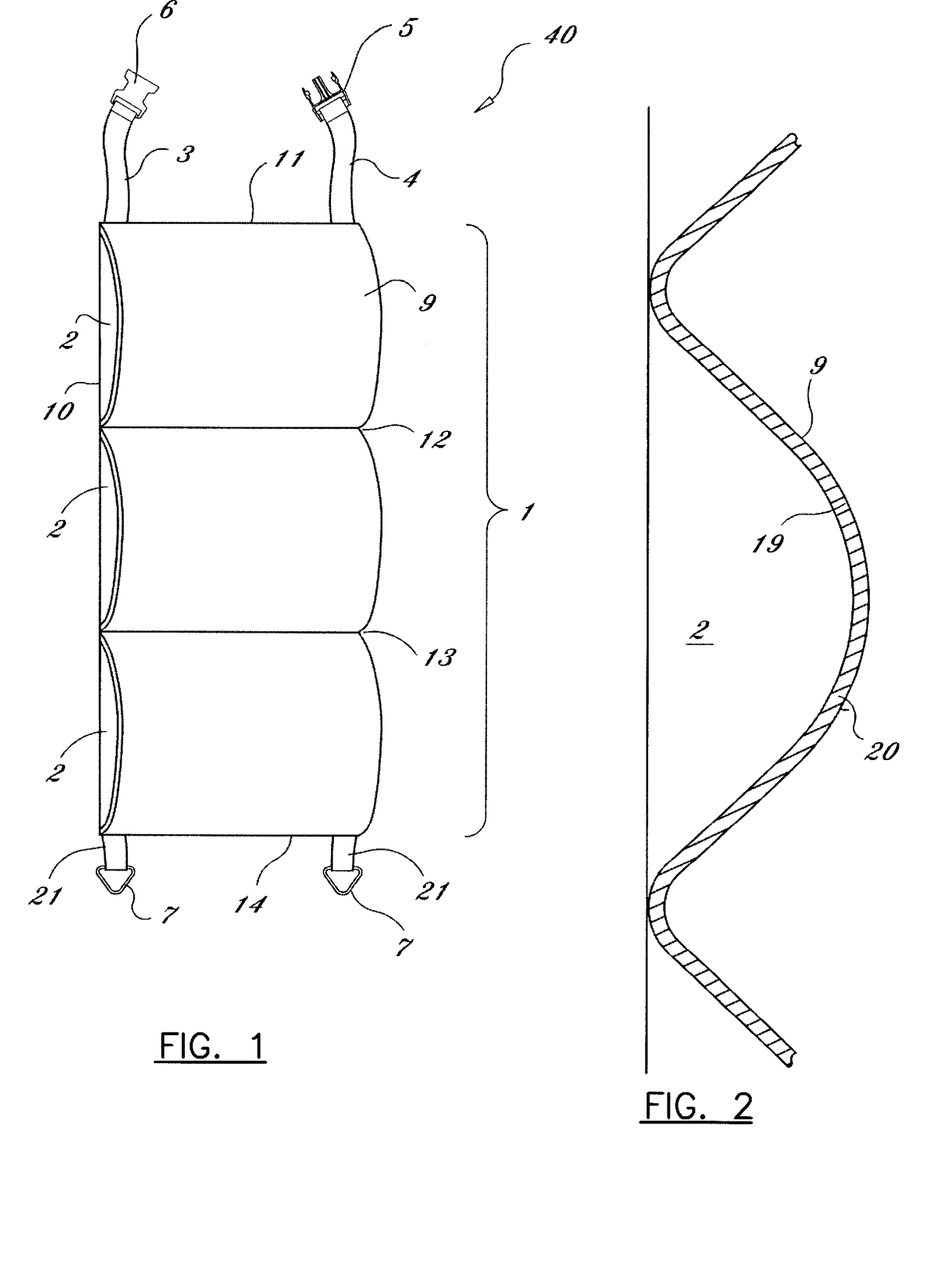
FIG. 1 is a pictorial view, in perspective, of one of two halves of the strap embodiment of the invention.
FIG. 2 is a side view of one of the compartments shown in FIG. 1.

Referring to FIG. 1, a preferred embodiment of one of two identical components of strap embodiment 40 of the invention. Sling 1 comprises face plate 9 which is attached to back plate 10 erably three) compartments 2. Approximately 6½ inches of back plate material and 8 inches of face plate material make up each compartment. Both face plate 9 and back plate 10 are made of flexible material. As indicated in FIG. 2, closed-cell foam layer 20 is bonded to the non-facing (interior) side 19 of face plate 9. Face plate 9 is attached to back plate 10 in the areas denoted as area 11, area 12, area 13, and area 14. The dimension of face plate 9 spanning area 11 to area 12 is greater than the span of back plate 10 over the same distance, thus forming one of compartments 2 that are capable of accommodating the butt end of a gun or a fishing rod having a reel. Other compartments 2 are similarly formed.

At one of the upper corners of sling 1, short weight-bearing strap 3 is attached. At the terminus of strap 3, female buckle portion 6 is attached. At the other upper corner of sling 1, long weight-bearing strap 4 is attached. Plastic male buckle portion 5 is threaded adjustably along the length of strap 4. At both lower corners of sling 1, straps 21 are attached. Straps 21 are connected to fastening points 7, which are preferably plastic or metal rings or triangles.

Referring to FIG. 2, a side view of one of the compartments 2 of the invention is presented. This view illustrates that closed-cell foam 20 is laminated to non-showing (interior) side 19 of face plate 9. Lamination is accomplished using heat, pressure, or adhesive, or a combination of these methods.

Figure 3:
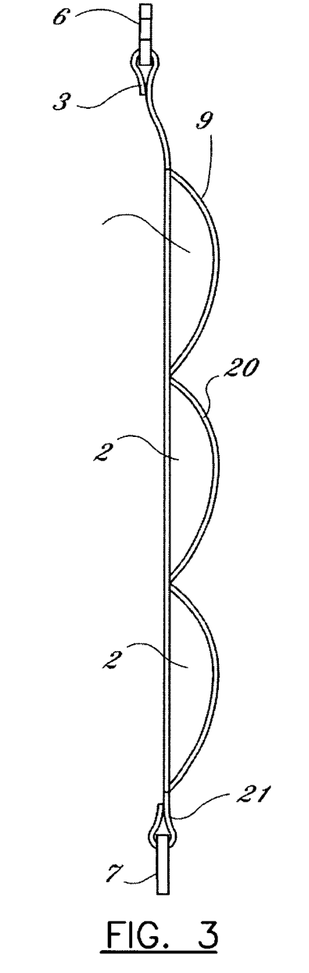
FIG. 3 is a side view of the embodiment shown in FIG. 1.

FIG. 3 shows a side view of sling 1, illustrating the configuration of compartments 2, and the fact that compartments 2 are open on both ends, allowing an implement, such as a shotgun, rifle or fishing rod to pass all the way through compartments 2.

Figure 4:
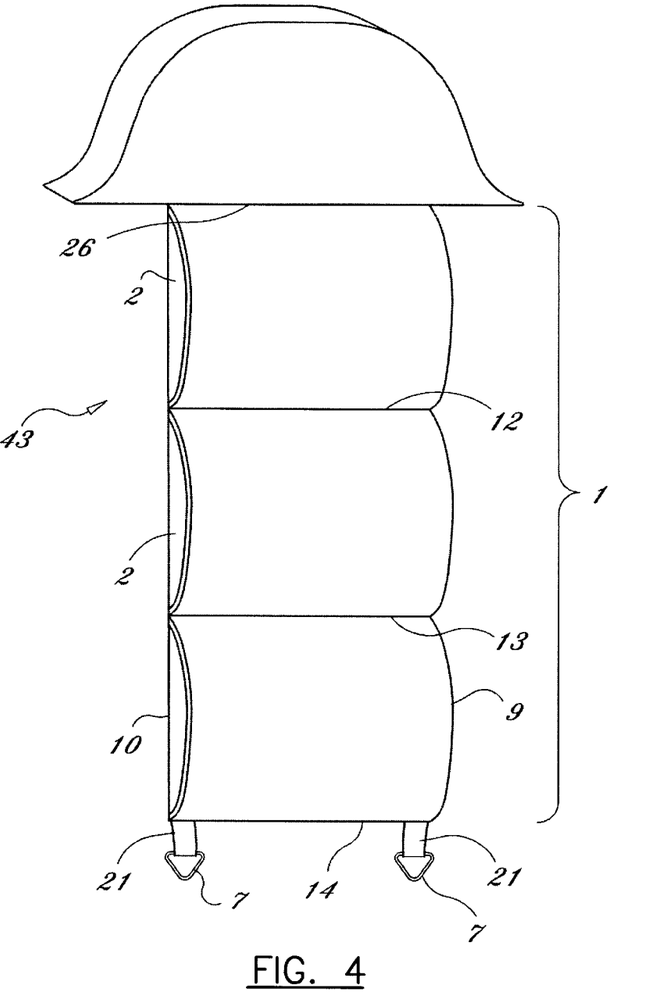
FIG. 4 is a pictorial view, in perspective, of one of two halves of the cap embodiment of the invention.

Referring to FIG. 4, one of two identical components of cap embodiment 43 of the invention is illustrated. FIG. 4 shows that cap 19 is attached to sling 1 at and along line 26. The shape of cap 19 is customized to fit the crown of the seat on which it is to be installed. Cap 19 covers about the top 25 percent of the seat.

Figure 5:
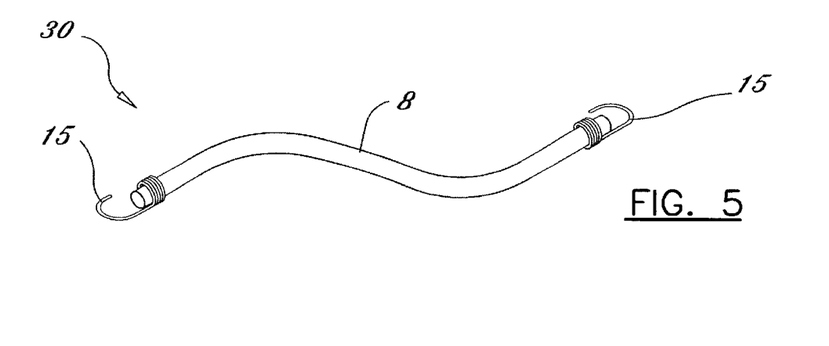
FIG. 5 is a pictorial view of a shock cord fastener.

FIG. 5 shows shock cord 30 which comprises elastic member 8 on either end of which is attached hook 15. Elastic member may be a cord, a band or webbing or any other conventional configuration.

Figure 6:
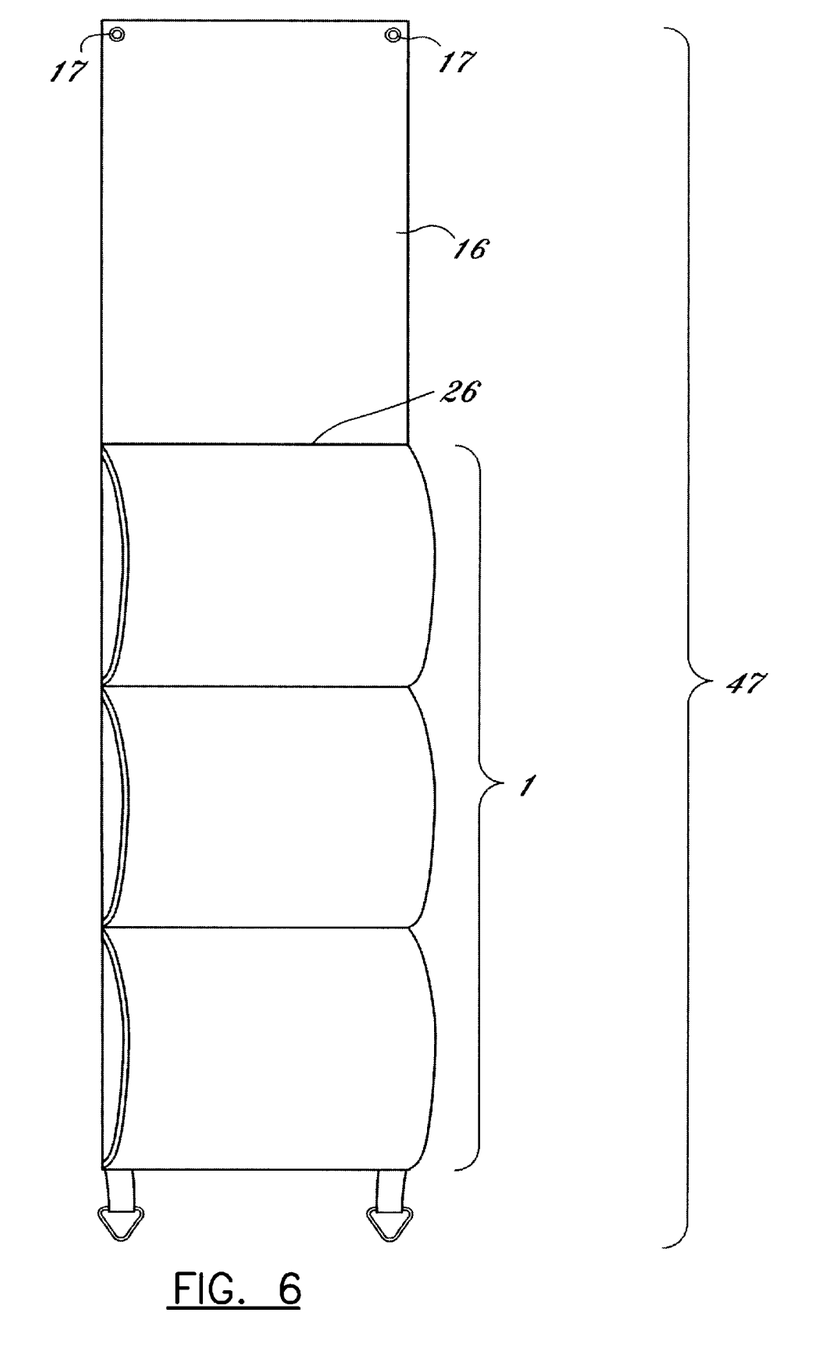
FIG. 6 is a pictorial view, in perspective, of one of two halves of the band embodiment of the invention.
Figures 7, 8:
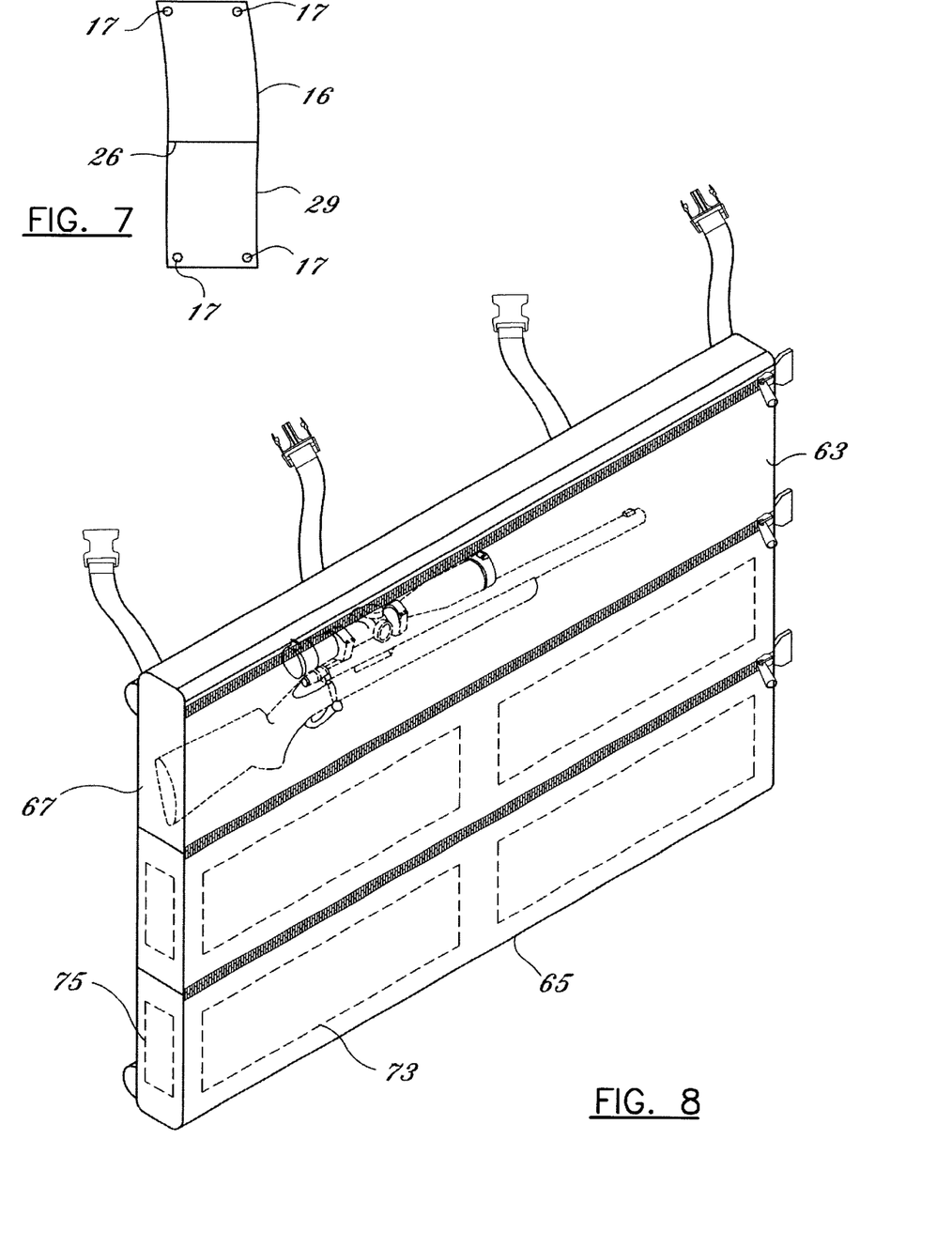
FIG. 7 is a pictorial view of the band component of the embodiment of the invention shown in FIG. 6.
FIG. 8 is a pictorial view of the casement embodiment of the invention.

Referring to FIG. 6, one of two identical components of band embodiment 47 of the invention is presented. FIG. 6 shows band 16 attached to sling 1 at and along line 26 with length of band 29 located below line 26. FIG. 7 shows band 16 before it has been attached to sling 1. In FIG. 7, grommets 17 are shown to be located in the four corners of the band 16, only two of which grommets (the top two) are visible in FIG. 6.

Referring to FIG. 8, casement embodiment 60 of the invention is illustrated. This embodiment comprises a plurality (preferably three) of prismatic compartments 61. Each prismatic compartment comprises face plate 9 having front portion 63 and bottom portion 65 which is attached to back plate 10. The compartments are sized to accommodate a gun in a horizontal position. The ends of each prismatic compartment 61 is closed by an end plate 67. Access to each prismatic compartment 61 is via closure 69, which is preferably a zippered closure, but which may be any other conventional closure, such as a Velcro® closure.

Figure 9:
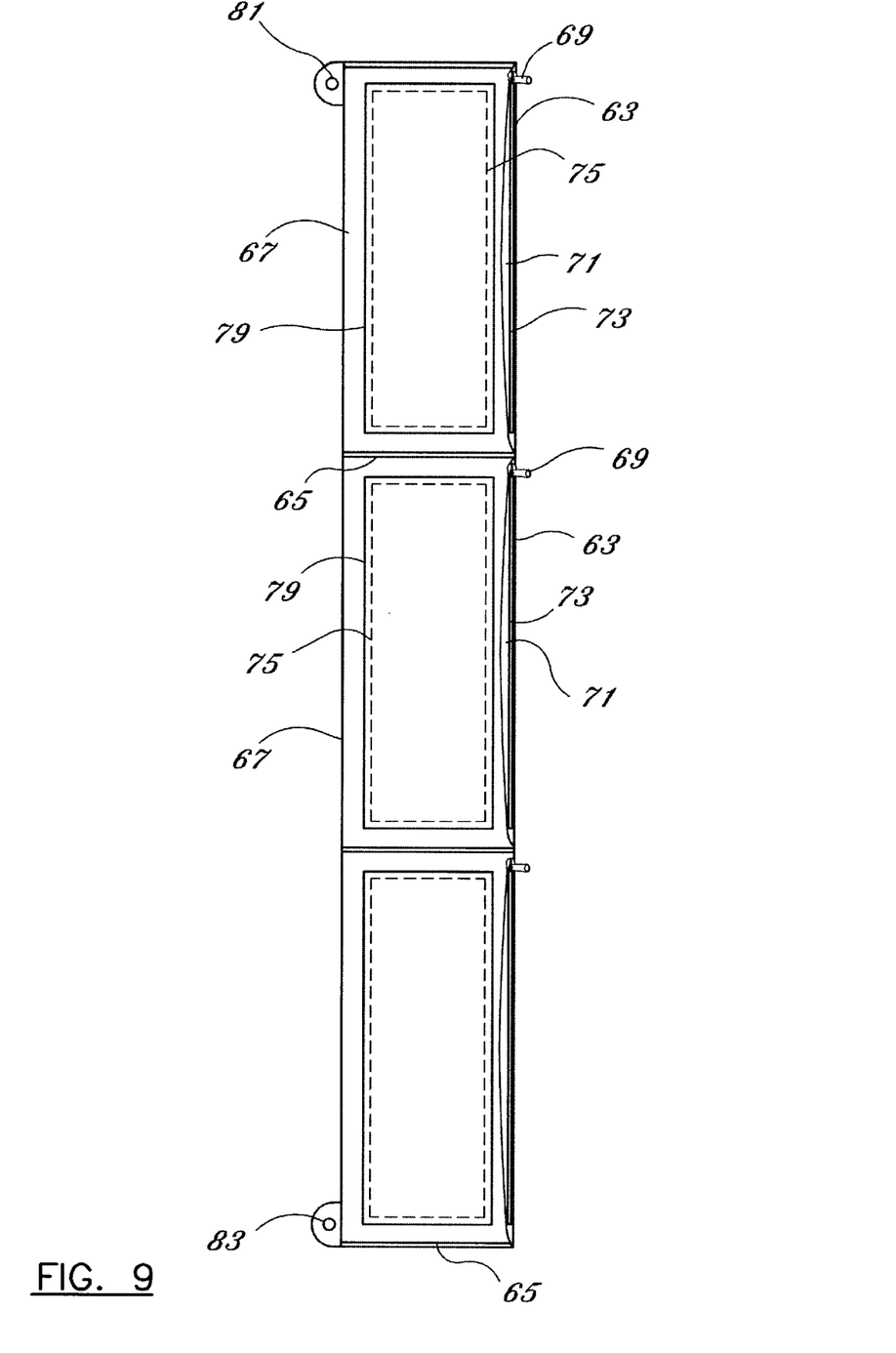
FIG. 9 is a cross-sectional view of the casement embodiment of the invention.

Referring to FIG. 9, front portion 63 is stiffened by two internal pockets 71 along its length, each of which internal pockets 71 contain a stiffener 73. Each stiffener 73 is preferably a piece of 1/16-inch thick polyethylene, but may be a similarly sized piece of wood or cardboard. In a preferred embodiment, each of internal pockets 71 is accessed via a Velcro® closure located near the middle of the inside surface of front portion 63. Each end plate 67 of each prismatic compartment 61 is stiffened by 1/16-inch thick plastic spacers 75, which are preferably 1½-inch inches by 6 inches in size, installed into an internal end pocket 79.

Referring to FIGS. 8 and 9, casement embodiment 60 also comprises 3/8-inch diameter top rod 81 which is slipped through loops attached to the back (outside) surface of back plate 10 to give character and definition to the product. In a preferred embodiment, top rod 81 comprises a left half and a right half that are releasably assembled end to end by means of a ferrule in a manner similar to that used with tent posts. Each end of assembled top rod 81 is inserted into a pocket that is sewed to back plate 10.

Casement embodiment 60 also comprises 3/8-inch diameter bottom rod 83 which is slipped through loops attached to the back (outside) surface of back plate 10 to give further character and definition to the product. In a preferred embodiment, bottom rod 83 comprises a left half and a right half that are releasably assembled end to end by means of a ferrule in a manner similar to that used with tent posts. Each end of assembled bottom rod 83 is inserted into a pocket that is sewed to back plate 10.

Casement model 60 is secured to the back of a vehicle seat in the same ways that the other models are secured. In a preferred embodiment, one end of each pair of short weight-bearing strap 3 and one end of each pair of long weight-bearing strap 4 are secured to assembled top rod 81. At the terminus of strap 3, female buckle portion 6 is attached. Plastic male buckle portion 5 is threaded adjustably along the length of strap 4. Similarly, a pair of straps 21 is attached to bottom rod 83.

Figure 10:
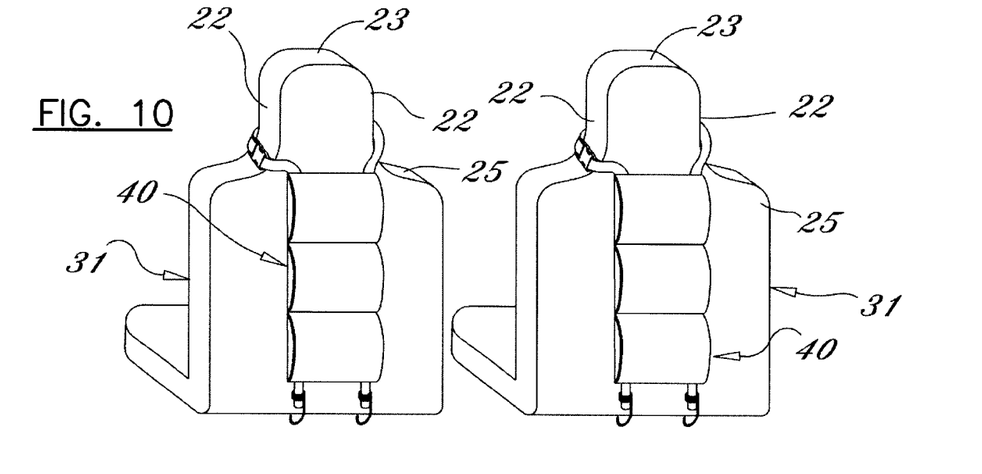
FIG. 10 is a pictorial view of the strap embodiment of the invention when attached to adjacent, tapered-shoulder vehicle seats.

Referring to FIG. 10, strap embodiment 40 of the invention is installed on two adjacent vehicle seats 31. FIG. 10, which is a view from the rear of seats 31, shows strap embodiment 40 installed on seat backs 25 with straps 3 and 4 fastened about crowns 23 of seats 31 in seat tapered shoulder regions 22.

Figure 11:
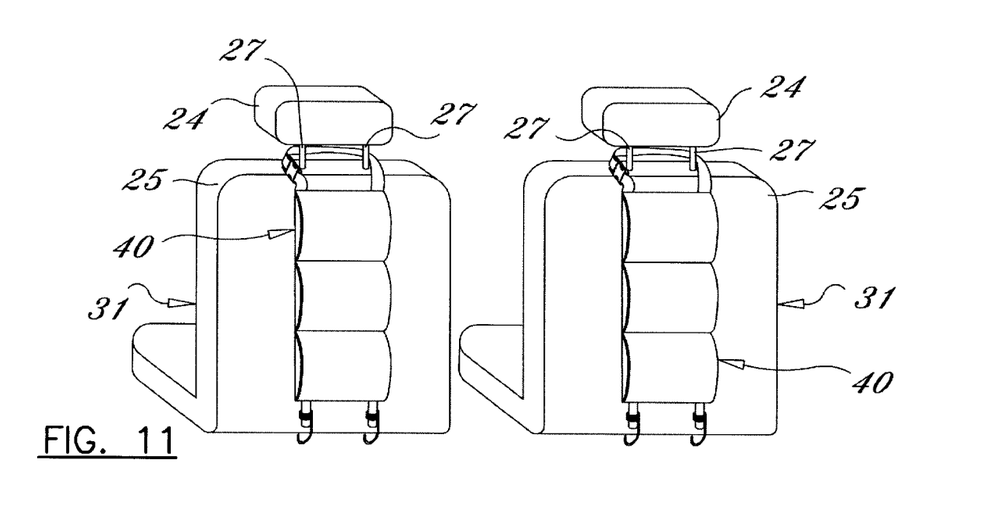
FIG. 11 is a pictorial view of the strap embodiment of the invention when attached to a vehicle seats with adjustable headrests.

Referring to FIG. 11, strap embodiment 40 of the invention is installed on two adjacent vehicle seats 31 equipped with adjustable headrests 24. The view is from the rear of seats 31 and shows attachment of straps 3 and 4 around headrest posts 27.

Figure 12:
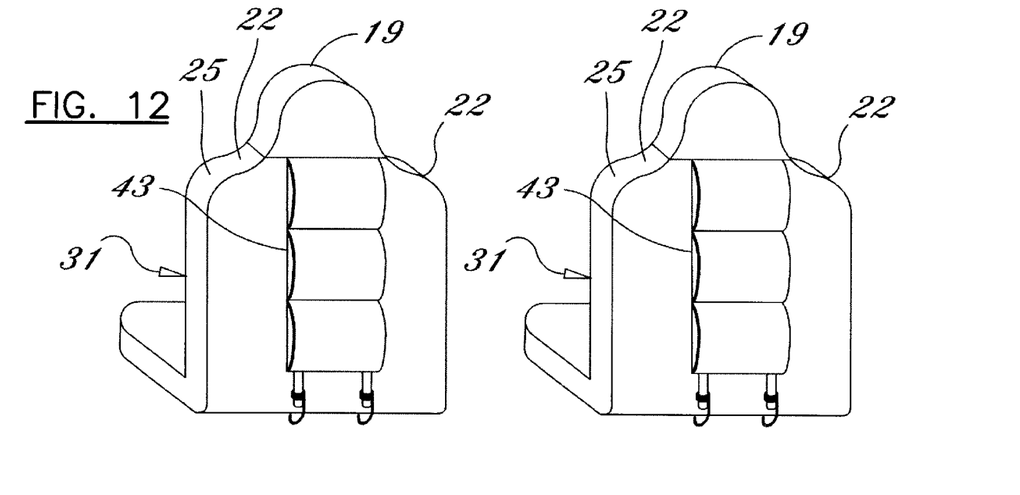
FIG. 12 is a pictorial view of the cap embodiment of the invention when attached to vehicle tapered shoulders.

Referring to FIG. 12, cap embodiment 43 of the invention is installed on two adjacent vehicle seats 31 on seat backs 25 with tapered shoulder regions 22. Each cap 19 is installed over a crown of a seat.

Figure 13:
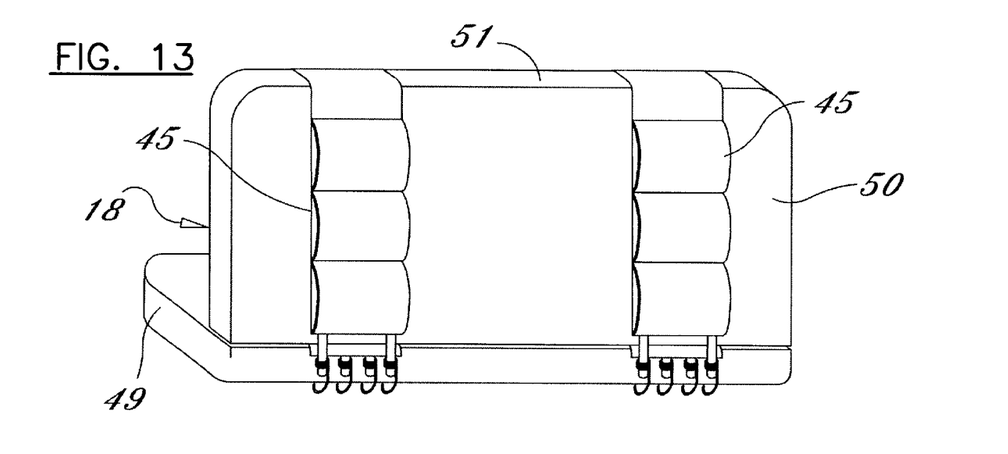
FIG. 13 is a pictorial view of the band embodiment of the invention when attached to a vehicle seat.
Figures 14, 15:
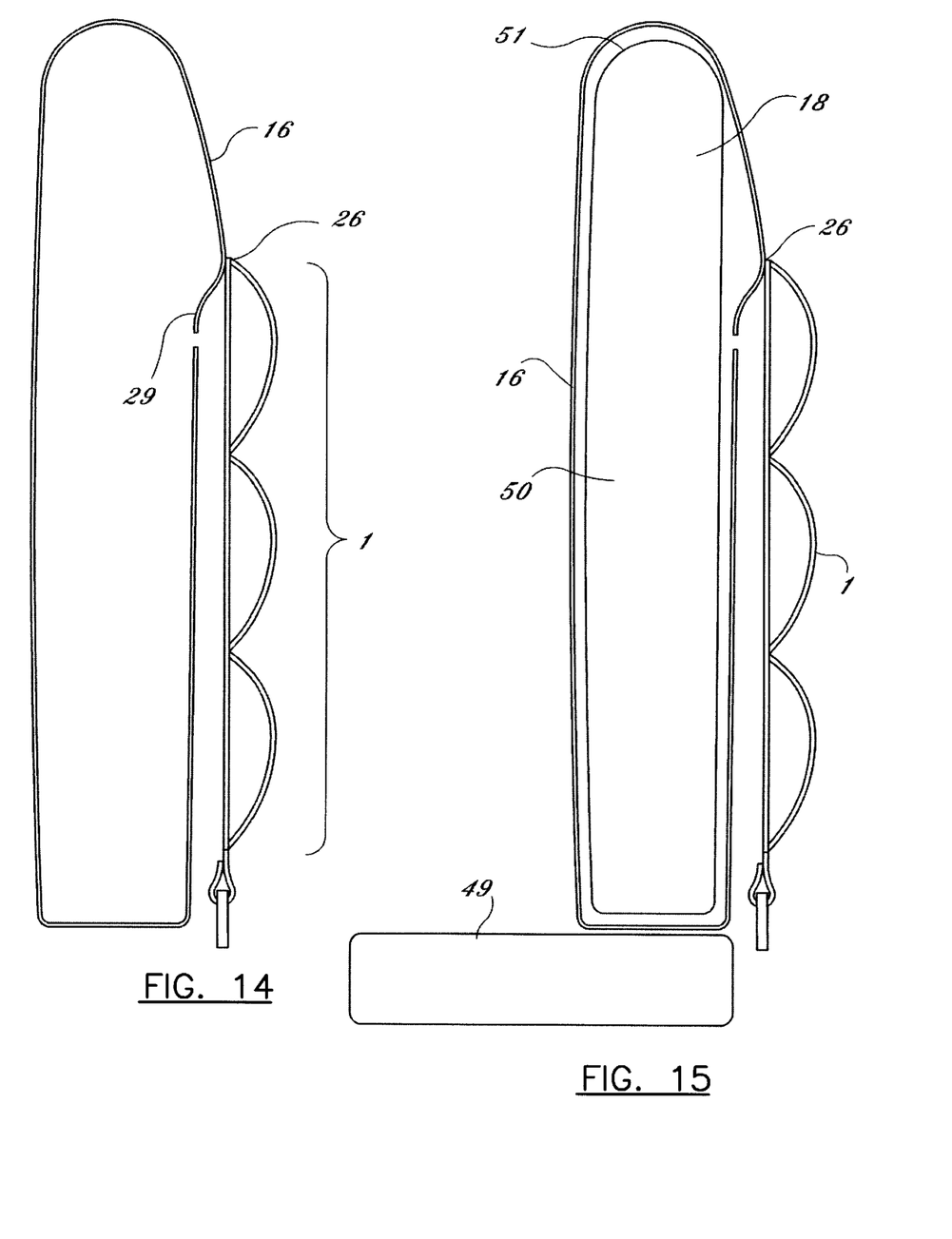
FIG. 14 is a pictorial view of half of the band embodiment, as seen from the side.
FIG. 15 is a side view of the band embodiment as installed on a solid bench seat.

Referring to FIG. 13, band embodiment 45 of the invention is installed on a solid-back bench seat 18. FIG. 14 illustrates a side view of one of the component halves of band embodiment 45. Band 16 is attached at the upper edge of sling 1 at point 26. Length 29 of band 16 is unattached to sling 1 below point 26.

FIG. 15 illustrates, in side view, band embodiment 47 installed on a solid-bench seat 18. Band 16 wraps around the vertical girth of the seat, through the junction of seat backrest 50 and seat cushion 49, then upwards toward point 26 at the top of sling 1 at which point it is attached to strap 16, preferably by means of shock cords 30.

A preferred embodiment of the invention is manufactured in the following steps. Fabric for faceplates 9 is sent, in 56- to 60-inch wide rolls, to a laminator who bonds ⅛-inch closed-cell foam 20 or neoprene to the non-showing side 19. Material, thus laminated, is forwarded to a convertor who "slits" the entire roll into strips having the desired width of face plates 9 and backplates 10. A convertor then "sheets" or "chops" the strips into approximately seven-inch by twenty-four-inch rectangles. Back plate material 10 is likewise slit and sheeted. Face plate material 9 and back plate material 10 is bound with a one inch wide nylon binding tape by means of sewing. The face plate 9 is attached, usually by sewing, to the back plate 10 to create compartments 2. One-inch nylon binding tape is sewn to the top and bottom edges at points 11 and 14. Strap 21 is inserted through fastening point 7, and doubled back on itself. Strap 21 is then attached to the bottom corners of sling 1. Short weight bearing strap 3 is fastened to buckle 6, then attached to one upper corner of sling 1. Long weight bearing strap 4 is threaded through buckle 5, then attached to the upper corner of sling 1.

To install strap embodiment 40 of the invention on vehicle seats, a user takes the following steps. Each long, weight-bearing strap 5 is caused to encircle the tapered shoulders 22 or headrest posts 27. Male buckle components 5 are inserted into female plastic buckles 6 until fully engaged. Tension is applied to the free end of straps 5, removing slack until the straps are taut. One hook 15 of shock cord 8 is hooked to a spring or wire under the vehicle seat. The other hook 15 of shock cord 8 is hooked to fastening point 7. The same hooking operation is performed for the other shock cords 8.

To install cap embodiment 43 of the invention, a user places a cap 19 over the crown of each seat 23. Hooks 15 of shock cord 8 are applied in the same manner as described above for the strap embodiment.

To install band embodiment 45 of the invention, a user pulls each of two. bands over ridge line 51 of the seat and down the front face of bench seat 18, tucks it through the gap (bight) between the front face and bottom seat cushion 49, and pulls it through. The grommets in the end tucked through the gap are then connected to the grommets in the upper end by means of tied ropes, shock cords or some other adjustable connector. Alternatively, one end of at least some of the shock cords are hooked to the grommets with the other ends hooked to wires or springs beneath bench seat 18.

Many variations of the invention will occur to those skilled in the art. Some variations attach to seats by vertically-oriented means, such as straps, caps or bands. Other variations call for attachment to seats by horizontally-oriented means, such as girdles. All such variations are intended to be within the scope and spirit of the invention.

We claim:

1. A seat-mounted gun and rod holder comprising:
 two slings, each of which slings comprises:
  a flexible back plate having two upper corners and two lower corners, and
  a flexible face plate having an interior side and an exterior side, said flexible face plate being attached to said flexible back plate to form a plurality of vertically-stacked compartments having two ends, each of said compartments being open on both ends and being sized to permit a gun having a butt or a fishing rod having a reel to pass all the way through the compartment in either direction;
 first means for fastening each of said upper corners of each sling to the top of a vehicle seat; and
 second means for fastening each of said lower corners of each sling to the bottom of the vehicle seat;
 wherein said two slings, when spaced apart and fastened to the vehicle seat, are capable of supporting a gun or rod at two points along the length of said gun or rod.

2. The gun and rod holder of claim 1 in which a closed-cell foam or neoprene layer is bonded to said interior side.

3. The gun and rod holder of claim 1 wherein the compartments are sized to accommodate the end of a gun case.

4. The gun or rod holder of claim 1 wherein said face plate is sewn to said back plate.

5. The gun and rod holder of claim 1 in which said first means for fastening each sling to the top of a vehicle seat comprises:
 a first weight-bearing strap attached to one of said upper corners, a second weight-bearing strap attached to the other of said corners, and a buckle for connecting the ends of said straps around the tapered shoulder region of the crown of the vehicle seat or around a headrest.

6. The gun and rod holder of claim 1 in which said first means for fastening each sling to the top of a vehicle seat comprises:
 a cap that is configured to fit over the crown of the vehicle seat.

7. The gun and rod holder of claim 1 in which said first means for fastening each sling to the top of a vehicle seat comprises:
 a band attached to the top of each sling, said band having a first end and a second end, said band being of sufficient length to wrap around the vertical girth of the seat, the ends of said band being fastenable together after the wrapping has occurred.

8. The gun and rod holder of claim 1 in which said second means for fastening each sling to the bottom of a vehicle seat comprises:
   an elastic member attached to each lower corner, each elastic member having a hook attached to the free end thereof for fastening the free end to a spring or wire under the vehicle seat.

9. The gun and rod holder of claim 8 wherein said elastic member is a shock-cord fastener.

10. A method for fabricating a rod and gun holder comprising:
   attaching a face plate to a back plate in a manner that causes a vertical stack of a plurality of compartments to be formed, each of which compartments being large enough to accommodate at least the butt of a rifle when the rifle is in a horizontal position;
   attaching a first means for fastening said holder to the top of a vehicle seat to the top of said back plate, wherein said attaching a first means for fastening step is selected from the group consisting of:
      attaching a first weight-bearing strap to the top of said back plate, attaching a second weight-bearing strap to the top of said back plate, and providing a buckle for connecting the ends of said straps around the tapered shoulder region of the crown of the vehicle seat or around a headrest,
      configuring a cap to fit over the crown of the vehicle seat, and
      attaching a band to the top of each sling, said band having a first end and a second end, said band being of sufficient length to wrap around the vertical girth of the seat, the ends of said band being fastenable together after the wrapping has occurred; and
   attaching a second means for fastening said holder to the bottom of the vehicle seat to the bottom of said back plate, wherein attaching said second means for fastening comprises:
      attaching a plurality of elastic members, each elastic member having a hook attached to the free end thereof for fastening the free end to a spring or wire under the vehicle seat.

11. The method of claim 10 further comprising:
bonding a closed-cell foam or neoprene layer to the inside surface of said face plate before the face plate is attached to said back plate.

12. The method of claim 10 further comprising:
attaching a first means for stiffening along the top of said back plate by which means said first means for fastening is attached to said back plate; and
attaching a second means for stiffening along the top of said back plate by which means said second means for fastening is attached to said back plate.

* * * * *